Patented Mar. 27, 1923.

1,450,128

UNITED STATES PATENT OFFICE.

LITTLETON S. BAKER, OF PASADENA, CALIFORNIA.

ANT POISON.

No Drawing.　　Application filed June 20, 1921.　Serial No. 479,102.

*To all whom it may concern:*

Be it known that I, LITTLETON S. BAKER, a citizen of the United States, residing at Pasadena, in the county of Los Angeles and State of California, have invented new and useful Improvements in Ant Poison, of which the following is a specification.

My invention relates to an ant poison and has for its object to compound an ant poison which will attract the ants and which will kill them by contact, as well as when taken internally.

The ordinary ant poison contains an arsenic compound, which, when eaten by the ants will kill them. It is believed that the number of ants killed by the ordinary ant poison is comparatively small. It is a well known fact that through some means of communication between the ants the dangerous nature of the compound is realized after the death of a small number of them, and the particular locality where the ant poison is deposited is shunned by the line of travel of the ants. As the main object is to keep ants out of dwelling places, and this object is realized when the ants change their order of march, the ordinary ant poison is satisfactory for the time being. However, the main body or colony of the ants is not destroyed and consequently, after after a short time the ants may reappear.

It is an object of this invention to provide an ant poison which will be carried into the nests of the ant colony and kill the ant queens, an ordinary ant hill having from thirty to fifty queens, and thereby destroy the colony.

It is another object of this invention to provide an ant poison which is effective as a dry powder, as well as in the form of a syrup.

With the above and other objects in view, which will appear as the description proceeds, my invention consists in the combination of ingredients hereinafter described and claimed.

The following ingredients are taken in the proportions stated:

Sugar 8 ounces.
Potassium cyanide (KCN) 2 ounces.
Arsenic trioxide ($As_2O_3$) ½ ounce.
Honey ¼ ounce.

These ingredients are thoroughly pulverized and mixed to form a homogeneous powder. I then add clean sand, preferably quartz sand, to make one pound of the composition, and mix the same thoroughly.

The honey may be omitted although it is useful because of its odor in attracting the ants. The arsenic trioxide may also be omitted, although the results are not as good in that case. In place of potassium cyanide any other solid poisonous cyanide may be used, and in place of the arsenic trioxide any other solid arsenic compound may be used.

The powder is sprinkled lightly along the line of march of the ants. Many ants are killed apparently by mere contact with the potassium cyanide. At any rate the poison appears to act so quickly that large numbers of ants are found dead along the line of march where the powder has been sprinkled.

The sand is an important ingredient of the composition as it prevents liquefaction of the compound for some length of time, from twenty-four to thirty-six hours, and serves to expose on a large surface minute quantities of the poison. The compound acts effectively after liquefaction when it assumes the form of a syrup, the ants eating the same.

The particular advantage of my composition consists in the fact that some of the grains of sand, to which minute quantities of the poison adhere, are carried into the interior of the ant hill or colony and there cause the death of a large number, and especially the queens, thus preventing the increase of the colony and destroying the same.

While I have stated the best proportions of the ingredients, as now known to me, it will be understood that the same may be varied widely by those skilled in the art with good results, and it will, of course, be understood that my ant poison is useful for the destruction of other insects besides ants.

In place of the sand any other inert and granular material may be used, and instead of the poisonous cyanide any other virulent poison may be used, although I prefer to use a cyanide, as stated.

Various changes may be made by those skilled in the art without departing from the spirit of my invention as claimed.

I claim:

An ant poison in the form of a powder, said powder consisting of grains of sand having adherent thereto a mixture comprising sugar, a cyanide, an arsenic compound and honey.

In testimony whereof I have signed my name to this specification.

LITTLETON S. BAKER.